United States Patent [19]

Evans

[11] 4,104,722
[45] Aug. 1, 1978

[54] METHOD AND APPARATUS FOR CELESTIAL NAVIGATION

[76] Inventor: Dow J. Evans, 6525 Hillcroft, Apt. 503, Houston, Tex. 77036

[21] Appl. No.: 722,085

[22] Filed: Sep. 10, 1976

[51] Int. Cl.$^2$ ............................................. G06F 15/50
[52] U.S. Cl. .................................. 364/455; 33/21 B; 33/268; 73/178 R; 364/518; 364/729
[58] Field of Search .................... 235/150.27, 150.271; 73/178 R; 33/1 SA, 21 B, 268; 364/455

[56] References Cited

U.S. PATENT DOCUMENTS

| | | | |
|---|---|---|---|
| 2,818,211 | 12/1957 | Macklem | 235/150.271 |
| 2,936,120 | 10/1960 | Bedrosian et al. | 235/150.271 X |
| 3,194,949 | 7/1965 | Jasperson | 73/178 R X |
| 3,214,575 | 10/1965 | Seliger et al. | 73/178 R X |
| 3,571,567 | 3/1971 | Eckermann | 33/268 X |

Primary Examiner—Jerry Smith

Attorney, Agent, or Firm—Bard, Springs, Jackson & Groves

[57] ABSTRACT

This invention provides an improved method and apparatus for celestial navigation. A reference spherical triangle is established from the coordinates of the ground position of an observed selected celestial body and an assumed position for the observer. A second right spherical triangle is then derived from a functional relationship between the first triangle and the observed height of the celestial body. The location of the end of the hypotenuse of the second triangle opposite the ground position defines a point of position on a line of position for the observer. The compass bearing for the line of position is functionally derived from conventional relationships and the line of position may be plotted through the point of position. Plotting means are provided to maintain the spaced relationship between lines of longitude and lines of latitude as a function of latitude for a mercator map projection and to directly plot the point of position on the plotting means.

24 Claims, 10 Drawing Figures fig.1 fig.2 fig.3 fig.10 fig. 4 fig.5 fig.8 fig. 6 fig.7 fig.9

METHOD AND APPARATUS FOR CELESTIAL NAVIGATION

BACKGROUND OF THE INVENTION

This invention relates to navigation techniques, and more particularly relates to improved celestial navigation methods and apparatus.

In celestial navigation, it is conventional to observe the position of the stars in the sky, and to translate the observation of these fixed reference points to a determination of an actual position on the face of the earth. If one projects a line running from the center of the earth to a selected celestial body, the line intersects the surface of the earth at a point called the ground position (GP) of the celestial body. The actual location of the GP on the surface of the earth varies as the earth rotates about its axis, and further varies as the inclination of the earth changes during the rotation of the earth about the sun. The GP location is described in terms of North or South Declination, and in terms of the Greenwich Hour Angle. The Declination is simply the degrees of latitude for the GP either north or south of the 0° latitude line known as the Equator. The Greenwich Hour Angle (GHA) is measured clockwise from the zero degree longitude reference line, known as the Greenwich Meridian, and is measured from zero to 360°. The ground positions of numerous selected celestial bodies have been calculated and published, and are available as a function of the date and hour for each day of the year, in tabular form in a variety of almanacs such as the *Nautical Alamanac* published yearly by the U.S. Government Printing Office.

In conventional celestial navigation, an observer begins by observing the height of a selected celestial body above the horizon using a sextant. This reading, when corrected for the height of the observer above the surface, and also for the effects of refraction from the earth's atmosphere, becomes the observed height (Ho) of the celestial body. The exact time at which Ho was obtained is recorded as a factor in the computation.

Using the above information, a "line of position" (LOP) is then derived as hereinbelow discussed. In the conventional method, the observer first selects an assumed location: Latitude (Laa) and Longitude (Loa). Next, the GP of the selected celestial body is calculated for the exact time at which the observation of the body occurred. From these two points on the face of the earth, a calculated height (Hc) is derived for the selected celestial body. The difference in magnitude between Hc and Ho defines a distance from the assumed position to the LOP.

Given the assumed position and the GP, the bearing of the GP from the assumed position can now also be calculated. If an arc is plotted through the assumed position along this compass bearing it will connect with the GP. It is now assumed that the actual position also lies along this same line. The line of position desired is then obtained by measuring the difference between Hc and Ho either toward or away from the GP along the connecting arc as indicated by the sign of the difference and drawing the line of position perpendicular to this connecting arc at this distance from the assumed position.

The LOP so determined provides a first reference line for determining the actual position of the observer. A plurality of such lines of position are then determined by observing other celestial bodies, and the intersection of these lines of position as plotted on a suitable chart then defines a point which is the actual position of the observer. More normally, a small triangle is formed on the chart by the intersection of these lines, and the actual position is taken to be the approximate center of this triangle.

The major problem with the foregoing conventional method for obtaining an actual position from observation of celestial bodies occurs when one attempts to plot the difference between Ho and Hc on a flat plotting surface. It is well known that the transformation of a spherical surface to a planar surface for purposes of conventional plotting results in distortions in the Longitude and/or the Latitude scales. One traditional projection, the Mercator Projection, displays uniform longitudinal scales as measured along lines of latitude, but yields distorted latitude spacings as measured along lines of longitude. This distortion is ascertainable and can be corrected when plotting changes in latitude directly along a longitudinal line. If, however, a distance is plotted at an angle to the line of longitude, as is normally the case, the resulting nonlinearities introduce unascertainable errors into the conventional plot. The magnitude of this distortion increases greatly as one proceeds a further distance from the equator or as the line of direction to the GP becomes oriented in a more East West direction.

This disadvantage of the prior art is overcome by the present invention, however, and improved methods and apparatus are provided for obtaining a more accurate determination of the actual position of an observer according to celestial navigation principles.

THEORY OF THE INVENTION

As hereinabove explained, the conventional method for determining an actual position from celestial observations requires that an LOP be plotted as determined by a line perpendicular to the arc connecting GP and (Laa, Loa) and a distance from (Laa,Loa) measured by the difference between Ho and Hc. In this instant invention, the LOP is directly determined by a point on the line in Latitude (Lap) and Longitude (Lop) and the bearing of the line (B). Further, Hc and B are computed directly and without reference to tabular computations.

The inputs for the method and system of the present invention are conventional: corrected observed height (Ho); declination (Dec N or S); Greenwich Hour Angle (GHA); and the assumed position of the observer (Laa and Loa). A first right spherical triangle is then defined from the GP coordinates and the assumed position. The leg opposite GP has an arc length $|Laa \pm Dec|$ where Dec is added when Laa and Dec are in opposite hemispheres. The leg opposite the assumed position has an arc length $|LHAa|$ where LHAa is a Local Hour Angle specially defined herein to be less than 180° and computed as follows:

$LHAa = |Loa - GHA|$, observer West of Greenwich.

$LHAa = |Loa - (360° - GHA)|$, observer East of Greenwich.

According to the present invention, the hypotenuse of the first right spherical triangle, Zenith distance computed (Zdc), is then functionally computed from the relationship $(Zdc = 90° - Hc)$ where Hc is the height computed in conventional celestial navigation methods and calculated from the conventional relationship, $$\sin Hc = (\cos Laa)(\cos Dec)(\cos LHAa) \pm (\sin Laa)(\sin Dec)$$

where the terms are added when the observer and GP are in the same hemisphere.

A second right spherical triangle is then defined, proportional to the first triangle and having GP as one apex. The hypotenuse of the second triangle, Zenith distance (Zd), is now ($Zd = 90° - Ho$), where Ho is the height of the celestial body measured by the observer and corrected. A functional representation of an error function, R, is generated from the relationship, $$R = |(Zd/Zdc) - 1|.$$

It is then easily demonstrated that the desired correction to the assumed position coordinates are given by $$\Delta La = |R| |Laa \pm Dec|$$

$$\Delta Lo = |R| |LHAa|.$$

The direction for the corrections are determined from the location of the observer, relative direction of GP from the observer and comparison of $[(Zd/Zdc) - 1]$ with zero, as fully explained in the detailed description.

The compass bearing, B, of the line of position is directly obtained by deriving a functional relationship of the direction (Z) of GP from the observer by the conventional formulation, $$\sin Z = (\cos Dec)(\sin LHAa)(\sec Hc).$$

For the observer in the northern hemisphere,
$B = 90° \pm Z$, (+) for celestial body East of observer.
For the observer in the southern hemisphere,
$B = 270° \pm Z$, (+) for celestial body West of observer.

It is apparent, therefore, that a point on the line of position has been defined directly by the coordinates $Lap = Laa \pm \Delta La$ and $Lop = Loa \pm \Delta Lo$. The other determinate of the line of position, compass bearing B, has also been directly computed.

BRIEF SUMMARY OF THE INVENTION

In a preferred embodiment of the present invention, conventional celestial navigation observations are used to produce output parameters which can be plotted on conventional map projections, whereby the position of the observer can be ascertained with improved accuracy. A reference spherical triangle is first established from the coordinates of the ground position (GP) of the selected celestial body observed (Dec N or S, and GHA), as derived from a conventional almanac and as determined from the time of observation of the selected celestial body, and also from the coordinates of an assumed position for the observer as expressed in terms of Latitude (Laa) and Longitude (Loa). A second right spherical triangle is then defined as having one point congruent to GP, and having its hypotenuse arc lying along the hypotenuse of said first spherical triangle. The length of the hypotenuse of said second spherical triangle is then computed from the observed height, Ho, of said celestial body and an error signal is generated which is functionally related to the magnitude of the ratio of the length of the hypotenuse of said second triangle and the hypotenuse of said first triangle. A convenient means is provided for ascertaining the sign of this representation of the magnitude of the error derived from observations of the relative locations of the GP and the observer. A point of position on the desired line of position, LOP, is determined by calculating appropriate increments of latitude and longitude from the assumed position.

In the preferred embodiment a convenient means is also provided for ascertaining the bearing of the LOP, directly whereby a more accurate plot of the LOP may be obtained. Further, an improved plotting board assembly is provided to cooperate with the output coordinates of said line of position and conveniently correct for non-linear variations in the spacings between lines of latitude as a function of latitude.

Accordingly, it is a feature of the present invention to improve the accuracy of position determination by celestial navigation by reducing the need to obtain data from almanacs and other tabular information.

It is another feature of the present invention to improve the accuracy for position determination by celestial navigation by providing improved output coordinates which reduce the error in plotting on conventional map projections.

It is yet another feature of the present invention to provide more accurate position determination from celestial navigation by providing simplified methods and apparatus for plotting lines of position.

It is a particular feature of the present invention to provide a more accurate position determination by celestial navigation by deriving the coordinates of a point of position on the line of position directly in latitude and longitude.

It is yet another feature of the present invention to provide a more accurate position determination by celestial navigation by obtaining prompt, accurate results without requiring special training of the operator.

Still another feature of the present invention is to directly obtain the bearing of a great circle route to any desired location when given the geographical coordinates of the desired location and the present location for the observer.

These and other features and advantages of the present invention will become apparent from the following detailed description, wherein reference is made to the figures in the accompanying drawings.

DETAILED DESCRIPTION

Figure 1:
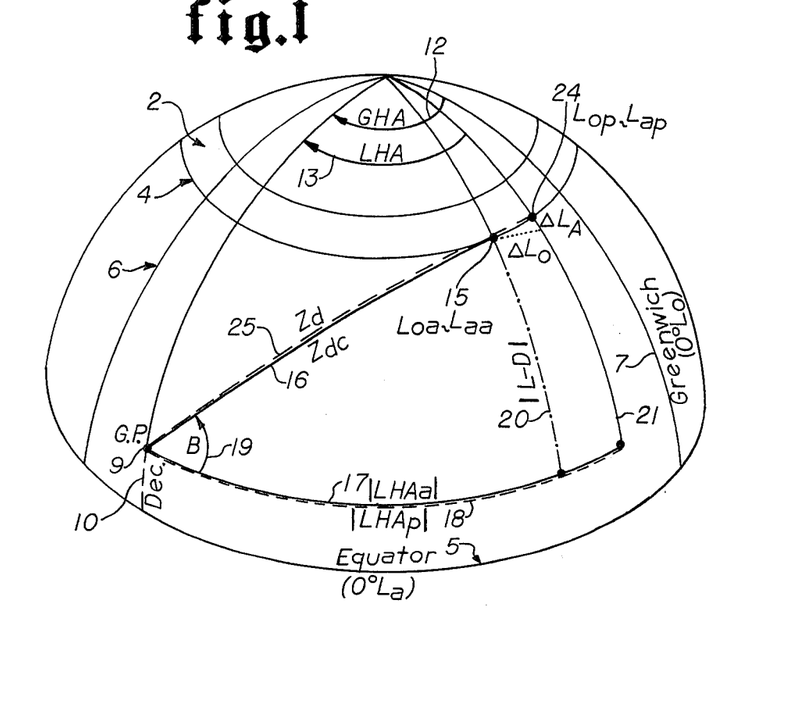
FIG. 1 is a graphic representation of a spherical surface illustrating the problem to which the present invention relates.

Referring now to the drawings, and more particularly to FIG. 1, there may be seen a representation of a spherical surface illustrating the problem to be solved in accordance with the present invention. The main planes of reference are the Greenwich Meridian 7, 0° longitude, and the Equator 5, 0° latitude. The position of an object is measured in degrees of latitude 4 and longitude 6 measured from said reference planes. The problem begins with an assumed position 15 (Loa,Laa) and a selected celestial body, wherein an imaginary line from the center of the earth to said selected celestial body intersects the earth at a ground position 9 (GP).

The GP 9 is located by reference to the Greenwich Hour Angle (GHA) 12 and Declination (Dec) 10 and whether said Declination 10 is North or South of the Equator 5. The celestial body is located with respect to the object whose position is to be determined by a Local Hour Angle (LHA) 13 and the separation in degrees of latitude, (Lap ± Dec). Further, a Zenith Distance (Zd) 25 is obtained from an observation made from the actual position of the observer or ship whose position is to be determined.

Referring again to FIG. 1, and using the method and apparatus of the present invention, and the inputs discussed above, a line of position, LOP, is obtained as defined by a point of position (Lop,Lap) 24, and a bearing (B) 19 for said LOP. Point of position 24 is obtained from proportional triangles, comprising a first triangle of known sides, |Laa − Dec| 20; the Zenith Distance as computed from the assumed position, (Zdc) 16; and LHAa 17. The legs of a second proportional triangle, LHAp 18 and |(Lap − Dec)| 21, are calculated from Zd 25.

Figure 2:
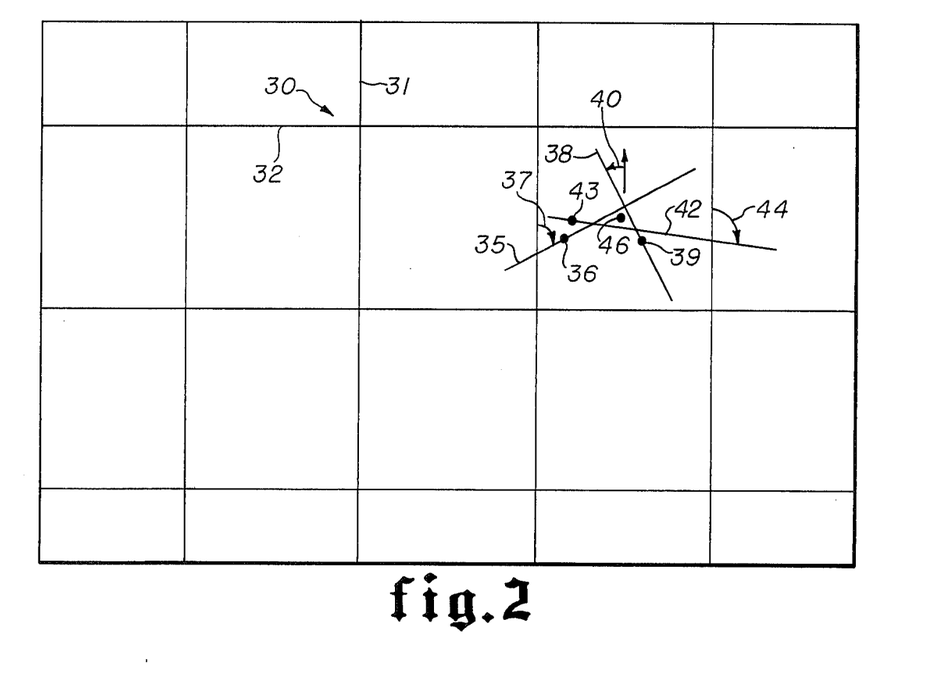
FIG. 2 is a graphic illustration of a celestial navigation plot completed in accordance with the present invention.

Referring now to FIG. 2, there may be seen a completed celestial navigation plot yielding an actual position for the observer or ship 46 determined by the intersection of three lines of position. A first line of position 35 is determined from a first point of position 36 and bearing angle 37. A second line of position 38 is then determined by plotting a second point of position 39 and plotting said line with bearing angle 40. Finally, a third line of position 42 is similarly defined by point of position 43 and bearing angle 44. The actual position 46 of the observer is now found at the intersection of said lines of position.

Figure 3:
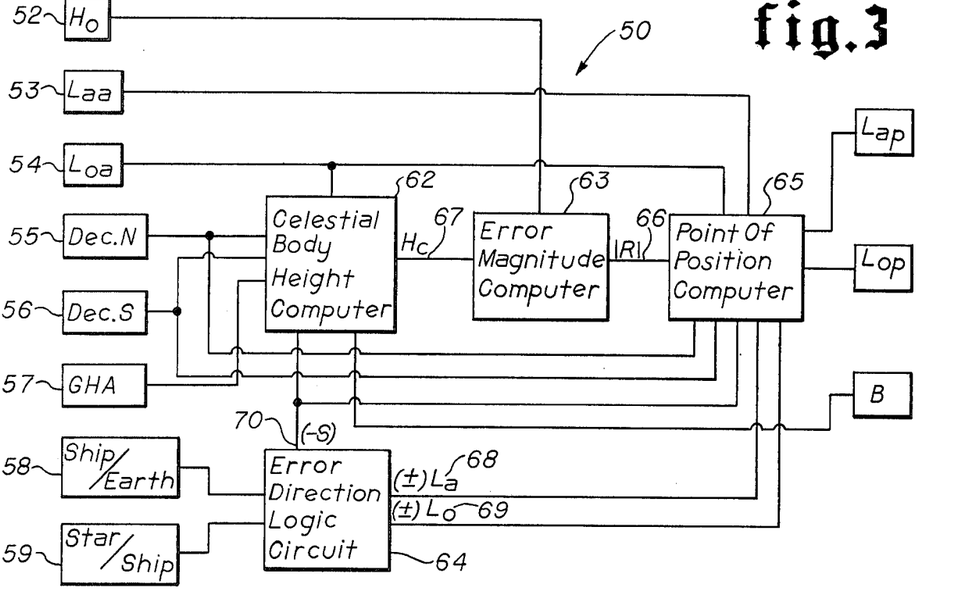
FIG. 3 is a simplified functional diagram of the basic components of one embodiment of apparatus for determining a line of position in accordance with the present invention.

Referring now to FIG. 3, there may be seen an overall schematic representing the method and apparatus for computing the determinates for the line of position in accordance with the present invention. The basic inputs to the system are the observed height of the selected celestial body (Ho) 52, assumed latitude (Laa) 53, assumed longitude (Loa) 54, North Declination (Dec N) 55, South Declination (Dec S) 56, Greenwich Hour Angle (GHA) 57, the quadrant of the earth 58 in which the observer or ship is located and the position of the celestial body relative to the ship 59. From the GP coordinates of the celestial body, the height of the celestial body above the assumed position (Hc) 67, is computed by the celestial body height computer 62. Ho 52 and Hc 67 are next transferred to the Error Magnitude Computer 63 which then derives a signal, |R| 66, representative of the magnitude of the difference in location between the assumed position and point of position. The relative ship position 58 and relative star position 59 are then input to the Error Direction Logic Circuit 64 to obtain a plurality of signals functionally representing whether the ship assumed position and the celestial body ground position are in the same hemisphere (−s) 70, a direction for the Latitude Error 68 and a direction for the Longitude Error 69. Finally, Laa 53, Loa 54, Dec N 55, Dec S 56, |R| 66 and the output signals from the Error Direction Logic Circuits 64 are transferred to a point of position computer 65. The output of the point of position computer 65 are the coordinates of a point of position (Lap, Lop) on the LOP. It will also be seen that the celestial body height computer 62 also directly derives the bearing angle (B) of the LOP.

Figure 4:
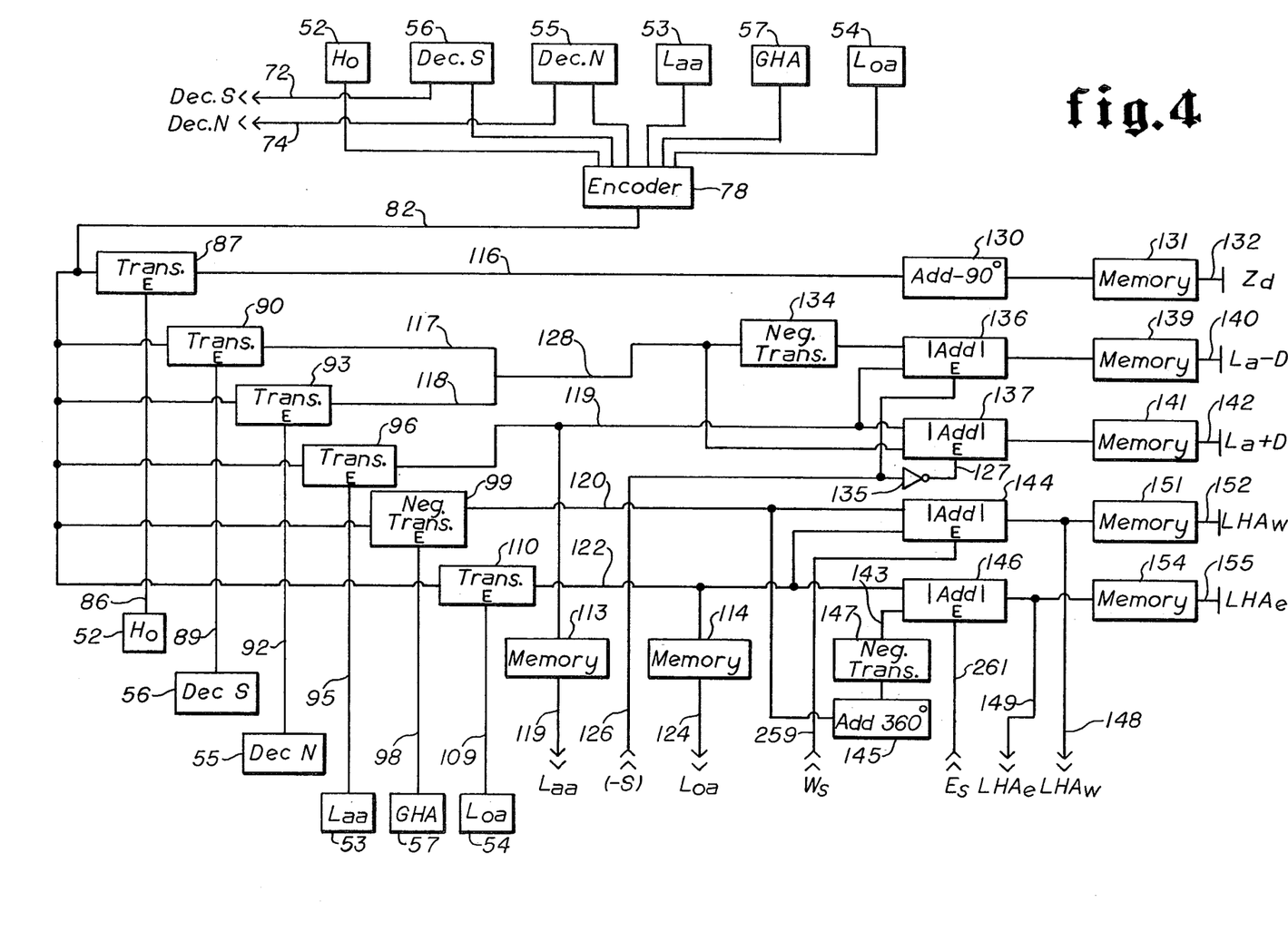
FIG. 4 is a more detailed functional diagram of a portion of the apparatus depicted in FIG. 3.

Referring now to FIG. 4, there may be seen a schematic of a preferred embodiment according to the present invention for obtaining the input parameters in a form suitable for data processing. As illustrated, the input data is encoded in degrees and minutes by Encoder 78. The output of Encoder 78 is than presented to Transfer Registers 87, 90, 93, 96, 99 and 110. Ho 52 is encoded and the data presented to Transfer Gate 87 enabled by Ho 86 and output Ho 116 in degrees and minutes is obtained. Ho 116 is presented to ADDER 130 for the addition of (−90°) and the output |Zd| is stored in Memory 131. Dec S 56 is encoded, Transfer Register 90 is enabled by Dec S 89 and the output Dec S 117 is obtained. Dec N 55 is also encoded and Transfer Register 93 is enabled by Dec N 92 to obtain output Dec N 118. Dec S 56 and Dec N 55 also provide hemisphere GP location signals S 72 or N 74, respectively. Laa 53 is encoded, Transfer Register 96 is enabled by Laa 95 and the output Laa 119 is obtained.

Referring again to FIG. 4, Dec S 117 or Dec N 118, as present, is combined with Laa 119 by first presenting Dec 128 through a Negative Transfer Register 134 to ADDER 136. Dec 128 is also presented to ADDER 137. The resulting output is determined by (−s) 126, a signal which represents that the celestial body GP and the ship are in the same hemisphere. Signal (−s) 126, as hereinbelow explained, is presented to ADDER 136 to enable output |Laa−Dec| 140 to transfer to Memory 139 if the ship and body are in the same hemisphere. Signal 126 is also presented to Inverter 135 whereby ADDER 137 is enabled to transfer signal 142 representing |Laa + Dec|. |Laa + Dec| 142 is stored in Memory 141 when the ship and celestial body are in opposite hemispheres.

GHA 57 is encoded and presented to Negative Transfer Register 99, enabled by GHA 98 to pass (−GHA) 120 to ADDER 144 and ADDER 145. In ADDER 145, (360°) is added and the output presented through Negative Transfer Register 147 to ADDER 146 as (−GHAe) 143. Loa 54 is encoded, Transfer Register 110 is enabled by Loa 109 to obtain Loa 122 which is presented to ADDER 144 and ADDER 146 and also stored in Memory 114 as Loa 124. ADDER 144 is enabled by Ws 259, if present, and |LHAw| 152 is transferred to Memory 151. ADDER 146 is similarly enabled by Es 261, if present, and |LHAe| 155 is transferred to Memory 154.

Figure 5:
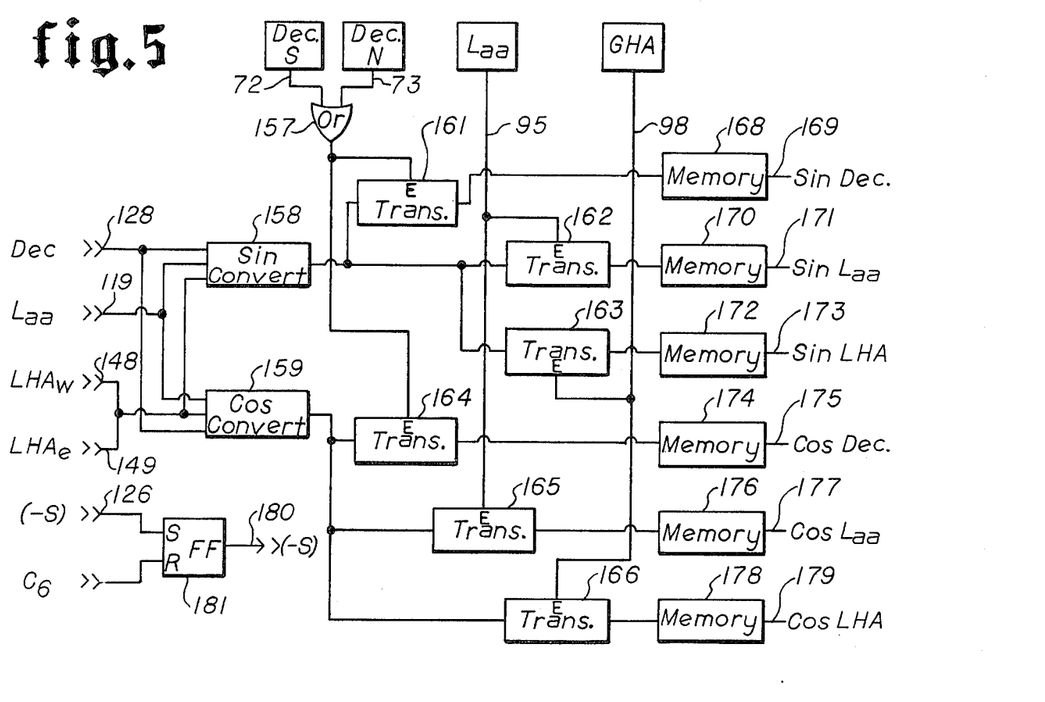
FIG. 5 is a more detailed functional diagram of yet another portion of the apparatus depicted in FIG. 3.

Referring now to FIG. 5, there may be seen a schematic of the remaining circuits necessary to prepare the input data for further processing. Dec 128, Laa 119, and LHAw 148 or LHAe 149 are each presented to SINE Converter 158 and COSINE Converter 159 as each is input to the system. Sin Dec is presented to Transfer Register 161. Dec S 72 and Dec N 73 are applied to OR Gate 157 whose output enables Transfer Register 161 to transfer Sin Dec 169, to Memory 168. Sin Laa is presented to Transfer Register 162, enabled by Laa 95 and stored as Sin Laa 171 in Memory 170. Sin LHA is presented to Transfer Register 163 which is enabled by GHA 98 and Sin LHA 173 is stored in Memory 172.

Further referring to FIG. 5, Cos Dec is presented to Transfer Register 164 enabled by the output of OR Gate 157 to transfer Cos Dec 175 to Memory 174. Cos Laa 177 is presented to Transfer Register 165 enabled by Laa 95 and stored in Memory 176. Cos LHA 179 is presented to Transfer Register 166 enabled by GHA 98 and stored in Memory 178. Finally, hemisphere signal ($-s$) 126 is presented to Flip-Flop 181 to provide output signal ($-s$) 180 when the ship and celestial body are in the same hemisphere.

Figure 6:
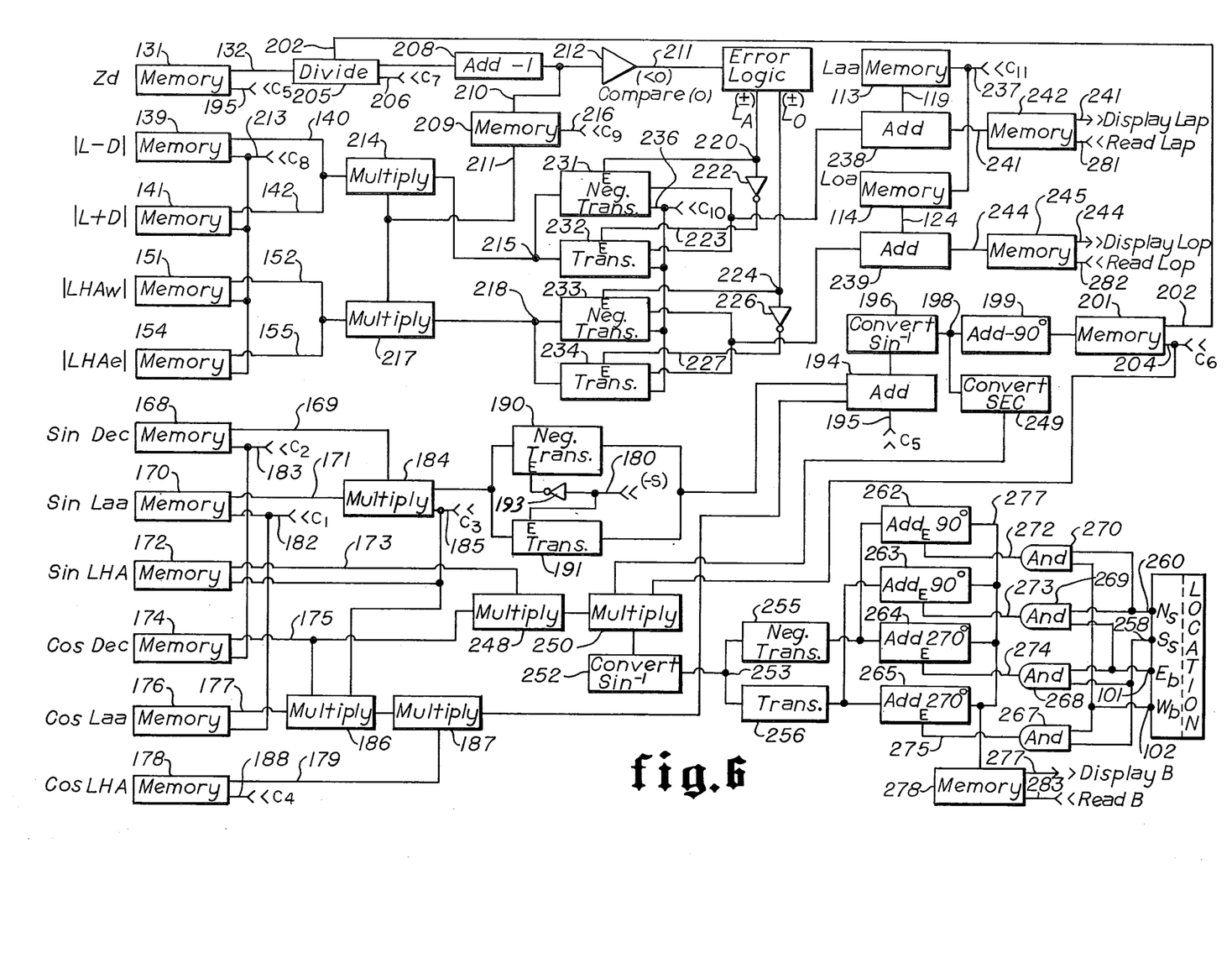
FIG. 6 is a more detailed functional diagram of the computation portion of the apparatus depicted in FIG. 3.

Referring now to FIG. 6, there may be seen a schematic of a preferred embodiment of the apparatus according to the present invention to compute the desired outputs from the prepared input data. During the computation process a standard pulse generator and logic circuit (not shown) are used to provide the clocked pulses which drive the computations. A first clock pulse 182 transfers Sin Laa 171 from Memory 170 to Multiplication Register 184 and Cos Laa 177 from Memory 176 to Multiplication Register 186. Second clock pulse 183 transfers Sin Dec 169 from Memory 168 for multiplication with the contents of Register 184 and Cos Dec 175 from Memory 174 for multiplication with the contents of Register 186. On clock pulse three 185, the contents of Register 184 are presented to Negative Transfer Register 190 and Transfer Register 191. Same-hemisphere signal ($-s$) 180 enables Register 191 and the absence of Signal 180 causes a signal at the output of NOT Gate 193 to enable Register 190. The contents of the enabled Register, either ($+$) or ($-$) (Sin Dec) (Sin Laa) are then transferred to ADD Register 194.

On clock pulse four 188, Cos LHA 179 is transferred from Memory 178 to be multiplied by the contents of Register 187, (Cos Dec) (Cos Laa), and on the fifth clock pulse 195 the output of Multiplication Register 187 are added to the contents of ADDER 194 and the output is transferred to INVERSE SIN Converter 196 to produce the computed celestial body height, Hc 198. Hc 198 is transferred to ADDER 199 to add ($-90°$) and the result, |Zdc| 202, is stored in Memory 201.

At the fifth clock pulse 195, |Zd| 132 is also transferred from Memory 131 to Division Register 205. At the sixth clock pulse 204, |Zdc| 202 is transferred from Memory 201 to Division Register 205 to be divided into the contents of Register 205. On the seventh clock pulse 206, the contents of Register 205 are presented to ADDER 208 where ($-1$) is added. The output of ADDER 208 is Error Function Magnitude (R) 210 and is stored in Memory 209. (R) 210 is also transferred to Comparator 212. If (R) 210 is greater than zero, the point of position is away from the assumed position relative to the celestial body GP and no output is provided. If (R) 210 is less than zero, the point of position is toward the celestial body GP from the assumed position and the Comparator provides an output to the Error Direction Logic Circuit more particularly described hereinbelow.

Referring again to FIG. 6, upon the eighth clock pulse 213, the contents of Memory 139 or Memory 141, |Laa − Dec| 140 or |Laa + Dec| 142 is transferred to Multiplication Register 214 and the contents of Memory 151 or Memory 154, |LHAw| 152 or |LHAe| 155 respectively, is transferred to Multiplication Register 217. At the ninth clock pulse 216, |R| 211 is transferred from Memory 209 and multiplies the contents of Register 214 and Register 217.

The output 215 of Register 214, functionally representative of the latitude error, is presented to Negative Transfer Register 231 and Transfer Register 232. The Error Direction Logic Circuit provides a Latitude Error Direction 220 output when the latitude error is negative. The presence of signal 220 enables Transfer Register 231. The absence of signal 220 results in an output 223 from NOT Gate 222 which enables Transfer Register 232. On clock pulse ten 236, the contents of the enabled register, 231 or 232, are transferred to ADDER 238. At the eleventh clock pulse 237, Laa 119 is transferred from Memory 113, added to the contents of ADD Register 238 and the resulting latitude point of position, Lap 241, is stored in Memory 242.

At the ninth clock pulse 216, |R| 211 also multiplies the contents of Multiplication Register 217 to produce signal 218 which is representative of the magnitude of the difference between the assumed longitude and the longitude of the point of position. An output from the Error Direction Logic Circuit is provided as signal 224 when the longitude error is negative. The presence of signal 224 enables Transfer Register 233 to transfer the negative of the longitude error signal, while the absence of signal 224 results in an output 227 from NOT Gate 226 which enables Transfer Register 234 to transfer signal 218. The signal from the enabled Register, 233 or 234, is presented to ADDER 239. The eleventh clock pulse 237 also transfers Loa 124 from Memory 114 to be added to the contents of ADDER 239 and produce the longitude of the point of position, Lop 244, which is stored in Memory 245.

Referring now to that portion of the circuit in FIG. 6 which derives the bearing for the line of position, it may be seen that the second clock pulse 183 transfers Cos Dec 175 from Memory 174 to Multiplication Register 248. Sin LHA 173 is then transferred from Memory 172 at the third clock pulse 185 and multiplied by the contents of Register 248 and the result transferred to Multiplication Register 250. The computed height of the celestial body, Hc 198, is also transferred to SECANT Converter 249, when obtained, and the output is transferred to Register 250. The contents of Register 250 are multiplied together at the sixth clock pulse 204 and the product transferred to INVERSE SIN Converter 252 to derive an output signal 253 functionally related to the azimuth of the celestial body.

The azimuth signal 253 must next be converted to the bearing for the line of position. To accomplish this, signal 253 is presented to both Negative Transfer Register 255 and Transfer Register 256 and the output of Register 255 is then input to ADDER 262 to add ($+90°$) and ADDER 264 to add ($+270°$). The output of Register 256 is input to ADDER 263 to add ($+90°$) and to ADDER 265 to add ($+270°$). The final output is then selected from these adders by providing an appropriate enabling signal from a logic circuit, described hereinbelow as FIG. 7, as determined by the North or South ship location, Ns or Ss, or East or West relative celestial body GP location, Eb or Wb. Ns 260 is applied to AND Gates 270 and 269, and Ss is applied to AND Gate 268 and 267. Similarly, Eb is applied to AND Gates 269 and 268 and Wb is applied to AND Gates 270 and 267. The selected line of position bearing, B 277, is then transferred to Memory 278.

The output representing the line of position bearing can also be used to obtain the compass heading for a great circle route from the observer to any selected geographic position. The coordinates of the selected location are simply changed to correspond to GP inputs, i.e., latitude to Dec N or S and longitude to GHA. The bearing thereby computed and displayed is then ± 90° from the desired heading for the great circle route. It may be noted, that the distance to the selected location is available as Zdc 202 and could be displayed by the addition of standard display circuitry.

The stored results are now available for suitable display. Read Signal 281 may be manually input and serves to transfer Lap 241 to a suitable decoder to a display degrees and minutes. Read Signal 282 transfers Lop 244 through a decoder to display and Read Signal 283 similarily displays B. Thus, the determinates of the line of position have been computed and made available for use.

Figure 7:
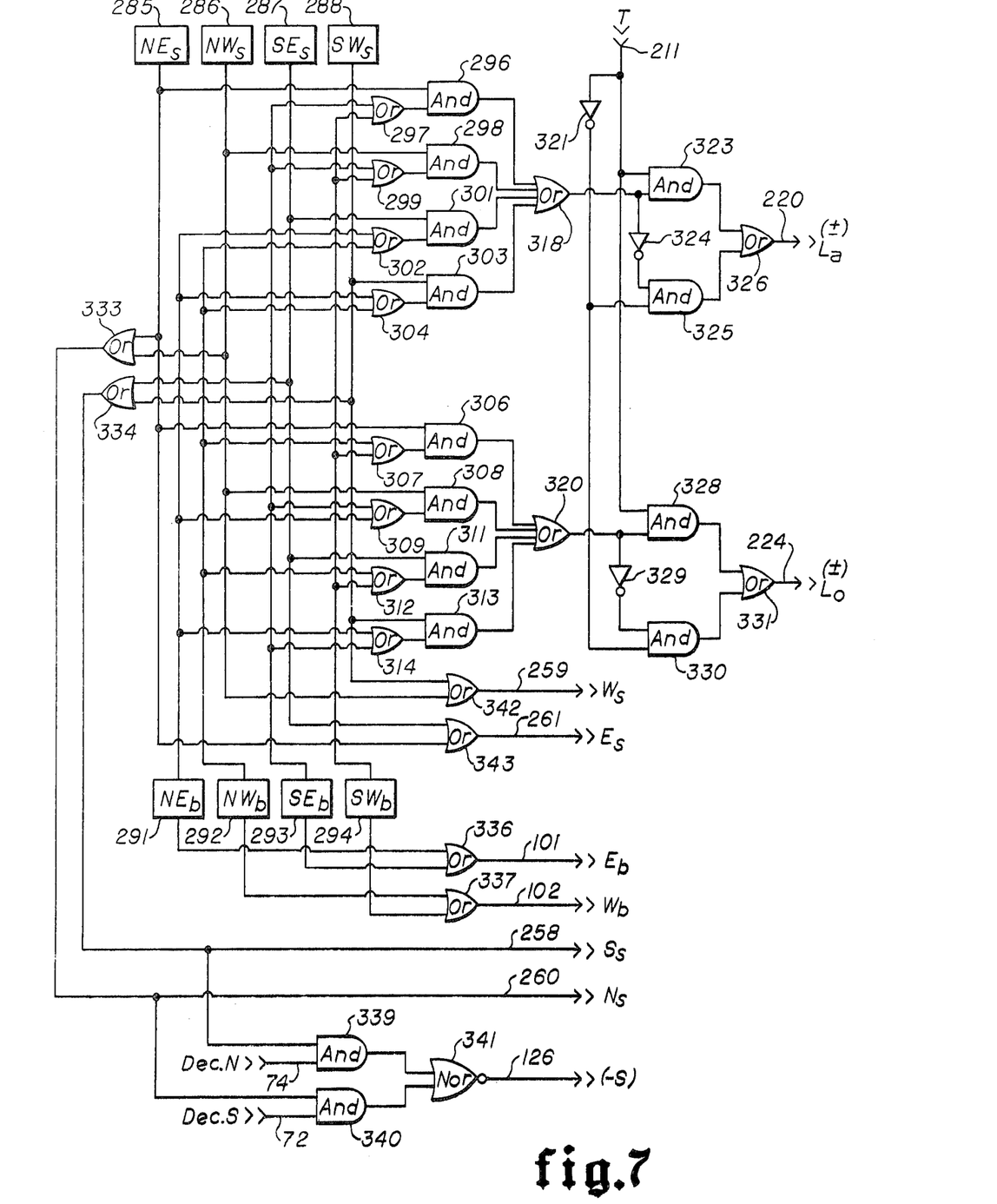
FIG. 7 is a more detailed functional diagram of the ship and celestial body relative position logic circuit depicted in FIG. 3.

Referring now to FIG. 7, there may be seen a schematic of the Error Direction Logic Circuit. A first set of inputs 285, 286, 287 and 288 are provided to identify the locations of the ship in the appropriate quadrant of the earth with reference to the Equator and Greenwich Meridian. A second set of inputs 291, 292, 293, and 294 are provided to identify the location of the ground position of the selected celestial body with respect to the ship. These inputs combine with a signal from the computation circuitry, described hereinabove, functionally representing whether the point of position is toward or away from the ground position from the assumed position. The resulting outputs indicate the direction of the latitude and longitude errors. The outputs of this logic circuit are fully described by the truth table, Table 1, set forth herein.

A typical output from the Error Direction Logic Circuit may be obtained by first referring to FIG. 1. Here, the ship is in the northwest quadrant (NWs) and the ground position of the celestial body 9 is located in the southwest quadrant (SWb) relative to the assumed position 15. As illustrated, Zd 25 is greater than Zdc 16 and the point of position 24 is away from the assumed position 15. Entering the logic circuit shown in FIG. 7, NWs 286 is applied to AND Gate 298 and AND Gate 308. SWb 294 is applied to OR Gate 299 but not to OR Gate 309. Accordingly, there is an output from AND Gate 298 but no output from AND Gate 308. The output from AND Gate 298 is transferred through OR Gate 318 to AND Gate 323. Since there is an output from Gate 318, there is no output from NOT Gate 324 and no input to AND Gate 325. There is no T 211 applied so an output appears from NOT Gate 321. Accordingly, neither AND Gate 323 nor AND Gate 325 are activated and no minus latitude error signal 220 appears at the output of OR Gate 326. Therefore, a positive latitude correction is obtained.

TABLE I

| N E$_s$ | N W$_s$ | S E$_s$ | S W$_s$ | N E$_b$ | N W$_b$ | S E$_b$ | S W$_b$ | T T̄ | L$_a$ (−) | L$_0$ (−) |
|---|---|---|---|---|---|---|---|---|---|---|
| 1 | 0 | 0 | 0 | 1 | 0 | 0 | 0 | 1 | 0 | 0 |
| 1 | 0 | 0 | 0 | 0 | 1 | 0 | 0 | 1 | 0 | 1 |
| 1 | 0 | 0 | 0 | 0 | 0 | 1 | 0 | 1 | 1 | 0 |
| 1 | 0 | 0 | 0 | 0 | 0 | 0 | 1 | 1 | 1 | 1 |
| 1 | 0 | 0 | 0 | 1 | 0 | 0 | 0 | 0 | 1 | 1 |
| 1 | 0 | 0 | 0 | 0 | 1 | 0 | 0 | 0 | 1 | 0 |
| 1 | 0 | 0 | 0 | 0 | 0 | 1 | 0 | 0 | 0 | 1 |
| 1 | 0 | 0 | 0 | 0 | 0 | 0 | 1 | 0 | 0 | 0 |
| 0 | 1 | 0 | 0 | 1 | 0 | 0 | 0 | 1 | 0 | 1 |
| 0 | 1 | 0 | 0 | 0 | 1 | 0 | 0 | 1 | 0 | 0 |
| 0 | 1 | 0 | 0 | 0 | 0 | 1 | 0 | 1 | 1 | 1 |
| 0 | 1 | 0 | 0 | 0 | 0 | 0 | 1 | 1 | 1 | 0 |
| 0 | 1 | 0 | 0 | 1 | 0 | 0 | 0 | 0 | 1 | 0 |
| 0 | 1 | 0 | 0 | 0 | 1 | 0 | 0 | 0 | 1 | 1 |
| 0 | 1 | 0 | 0 | 0 | 0 | 1 | 0 | 0 | 0 | 0 |
| 0 | 1 | 0 | 0 | 0 | 0 | 0 | 1 | 0 | 0 | 1 |
| 0 | 0 | 1 | 0 | 1 | 0 | 0 | 0 | 1 | 0 | 0 |
| 0 | 0 | 1 | 0 | 0 | 1 | 0 | 0 | 1 | 0 | 1 |
| 0 | 0 | 1 | 0 | 0 | 0 | 1 | 0 | 1 | 0 | 0 |
| 0 | 0 | 1 | 0 | 0 | 0 | 0 | 1 | 1 | 0 | 1 |
| 0 | 0 | 1 | 0 | 1 | 0 | 0 | 0 | 0 | 1 | 0 |
| 0 | 0 | 1 | 0 | 0 | 1 | 0 | 0 | 0 | 1 | 0 |
| 0 | 0 | 1 | 0 | 0 | 0 | 1 | 0 | 0 | 1 | 1 |
| 0 | 0 | 1 | 0 | 0 | 0 | 0 | 1 | 0 | 1 | 0 |
| 0 | 0 | 0 | 1 | 1 | 0 | 0 | 0 | 1 | 0 | 1 |
| 0 | 0 | 0 | 1 | 0 | 1 | 0 | 0 | 1 | 0 | 1 |
| 0 | 0 | 0 | 1 | 0 | 0 | 1 | 0 | 1 | 0 | 0 |
| 0 | 0 | 0 | 1 | 0 | 0 | 0 | 1 | 1 | 0 | 0 |
| 0 | 0 | 0 | 1 | 1 | 0 | 0 | 0 | 0 | 1 | 0 |
| 0 | 0 | 0 | 1 | 0 | 1 | 0 | 0 | 0 | 1 | 1 |
| 0 | 0 | 0 | 1 | 0 | 0 | 1 | 0 | 0 | 1 | 0 |
| 0 | 0 | 0 | 1 | 0 | 0 | 0 | 1 | 0 | 1 | 1 |

Referring to AND Gate 308, there is no output to apply to OR Gate 320 and, thus, to AND Gate 328. There is, accordingly, an output from NOT Gate 329 applied to AND Gate 330 and combining with the output of NOT Gate 321, produces a signal applied to OR Gate 331, thereby producing a Negative Longitude Error Signal 224. The output signals from this circuit feed back to the error magnitude R for determining the direction of the point of position relative to the assumed position.

Referring again to FIG. 7, there may be seen other logical outputs provided: Eb 101 and Wb 102 indicate the East or West bearing of the celestial body relative to the ship; Ss 258 and Ns 260 indicate the North or South location of the ship relative to the Equator; and (−s) 126 indicates that the ship and the ground position of the celestial body are located in the same hemisphere. To obtain Eb 101, the outputs of NEb 291 and SEb 293 are applied to OR Gate 336 resulting in the desired signal. Similarly, to obtain Wb 102 the outputs from NWb 292 and SWb 294 are applied to OR Gate 337 resulting in Wb 102. NEs 285 and NWs 286 input to OR Gate 333 resulting in Ns 260. Also SEs 287 and SWs 288 input to OR Gate 334 to produce Ss 258.

To obtain (−s) 126, Ss 258 and Dec N 74 are applied to AND Gate 339 to provide an output where the ship and GP are in different hemispheres. Similarly, Ns 260 and Dec S 72 are applied to AND Gate 340 to also provide an output for different hemisphere locations. These outputs are provided to NOR Gate 341, thereby obtaining an output only when the ship and ground position are in the same hemisphere.

Figure 8:
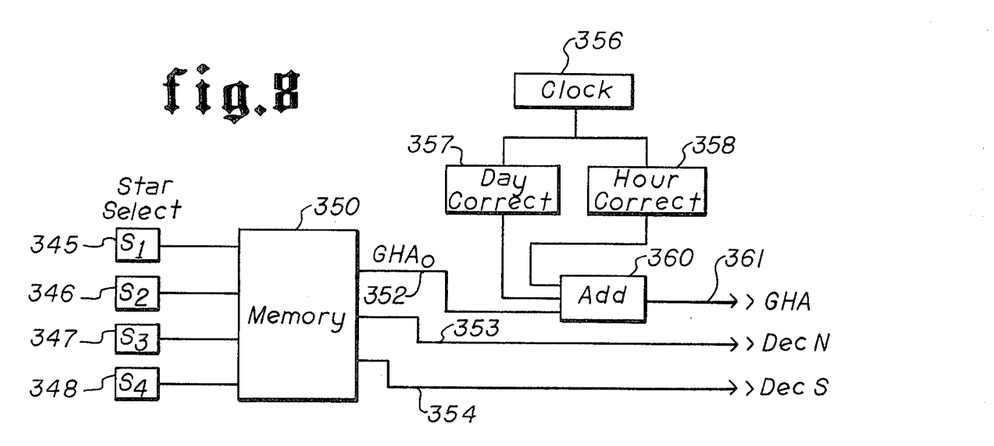
FIG. 8 is a simplified functional diagram of a data generating circuit for providing selected celestial body input data.

Referring now to FIG. 8, there may be seen an alternate means for providing coordinates of the ground position of the celestial body. Memory 350 is provided to store the starting ground position, GHAo and Declination North or South, for a selected group of celestial bodies. As illustrated, the desired celestial body is selected by the appropriate input 345, 346, 347 or 348 to recall the starting ground position from Memory 350. The average Declination, Dec N 353 or Dec S 354, is immediately available at the output. The starting GHAo 352 is transferred to ADDER 360 for correction. The correction circuitry is provided by clock 356 which inputs to Day-Correct Circuit 357 and Hour-Correct Circuit 358 whereupon fixed multipliers determine the change in degrees and minutes which have occurred since the starting position, GHAo 352, was determined. The output from Day-Correct 357 and Hour-Correct 358 are provided to ADD Register 360 and the resulting output GHA 361 is the corrected GHA for the time of the sighting of the selected celestial body. The time corrections from clock 356 may be provided automatically or may be manually input to the time correction circuits 357 and 358.

Figure 9:
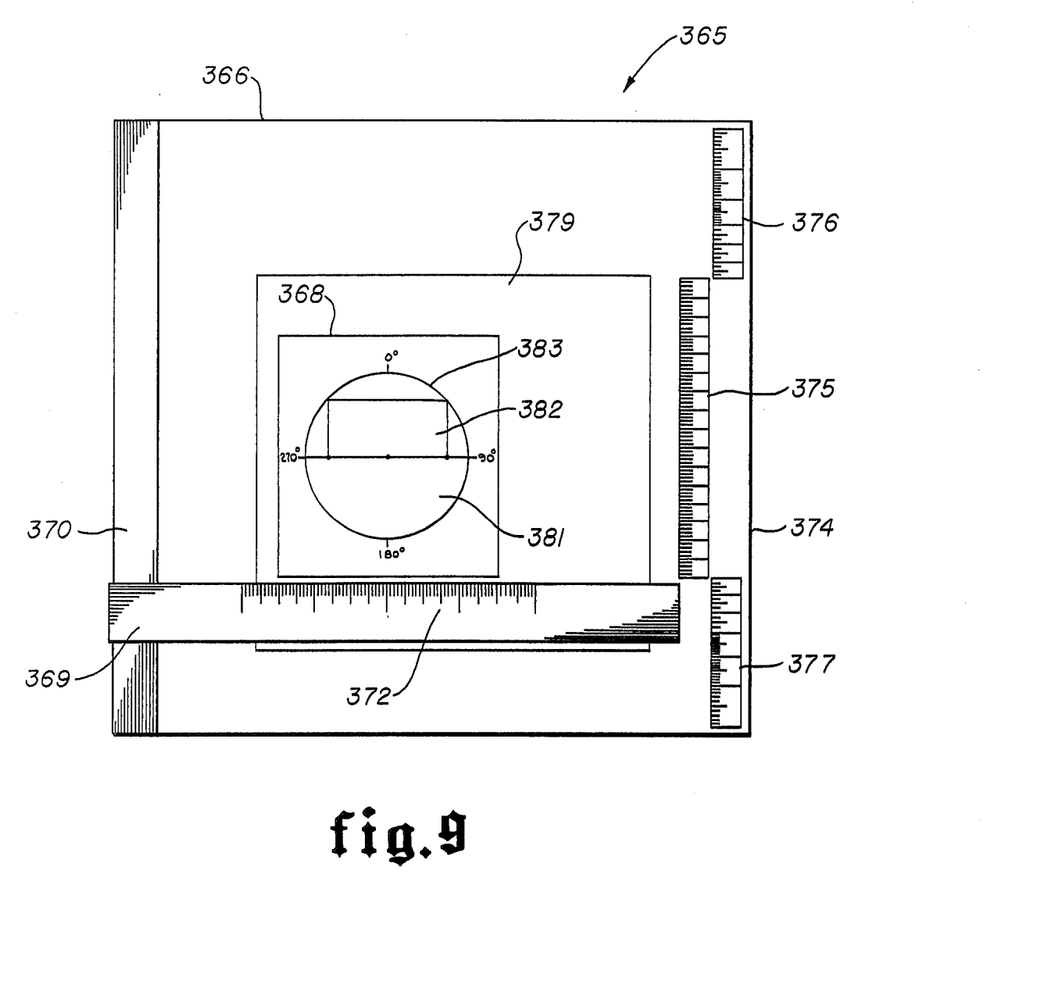
FIG. 9 is a plan view of an improved plotting board assembly suitable for use with the method and apparatus of the present invention.

Referring now to FIG. 9, there may be seen a plotting board assembly 365 for use with the method and apparatus described hereinabove for plotting lines of position. Plotting board 366 is provided with plotting compass assembly 368 mounted thereon with a means for lateral movement 369 and a means for vertical movement 370 along plotting board 366. Scale 372 provides a scale for degrees and minutes of longitude which are uniformly spaced as in a standard Mercator Projection. Latitude scale 374 is also provided and is comprised of scale 375 to read degrees and minutes of latitude and scales 376 and 377 which are used to correct latitude scale 375 for use in plotting a Mercator Projection. Latitude scale 375 is comprised of a flexible or extensible member whose end can be moved to the line of latitude desired on scale 376 and scale 377. The spacing of the lines on the scale 375 will correspondingly increase to automatically correct for the spacing variations obtained in a Mercator Projection. Accordingly, longitude and latitude may be plotted directly against their corresponding scale members without further correction.

Once an assumed or actual latitude is established, the reference coordinate structure is established by moving the ends 385 and 386 (see FIG. 10) of latitude scale 375 to latitude representations on correcting scales 376 and 377, respectively, which are ±1° from the established latitude. Flexible latitude scale 375 may conveniently be formed from a variety of conventional elastic materials. Reference markings are placed on the unextended material at a spacing related to the spacings of the longitude markings, as hereinbelow discussed. Thus, the spacings between the markings on latitude scale 375 will vary as the scale is expanded or relaxed. The ends 385 and 386 of scale 375 may be fixed adjacent correction scales 376 and 375, if desired, or reference coordinates may simply be marked on plotting paper and scale 375 returned to normal. Any conventional means for securing the ends of an elastic material might be used to fix ends 385 and 386, such as a pin, snap, or hook-and-eye type material.

Plotting compass assembly 368 is first moved to the desired position on the plotting board. The point of position is then determined by the method and apparatus hereinabove discussed and plotted along the sides of window 382 and rotatable disc 381 of the plotting compass assembly 368. Rotatable disc 381 is turned so as to indicate the bearing of the line of position along the compass rosette 383 inscribed about the periphery of rotatable disc 381 and the line of position is drawn along that bearing and through the point of position already plotted.

The use of flexible or extensible scale 375 to automatically provide the correct spaced relationship for the latitude scale enables accurate plotting to be performed without the need for special chart paper or a complicated determination for the spacing of the latitude lines at varying latitudes.

It should be noted the latitude scale 374 and plotting compass assembly 368 can be adapted for use with existing plotting boards. Latitude scale 374 comprising a flexible or extensible scale 375 and error scales 376 and 377 may be provided in a unit which can be detachably affixed along the sides of existing plotting boards to conform to available mercator projection plotting paper and used directly with existing celestial navigation techniques. Further, plotting compass assembly 368 may be used with standard plotting boards to plot lines of position obtained from conventional navigation methods.

Figure 10:
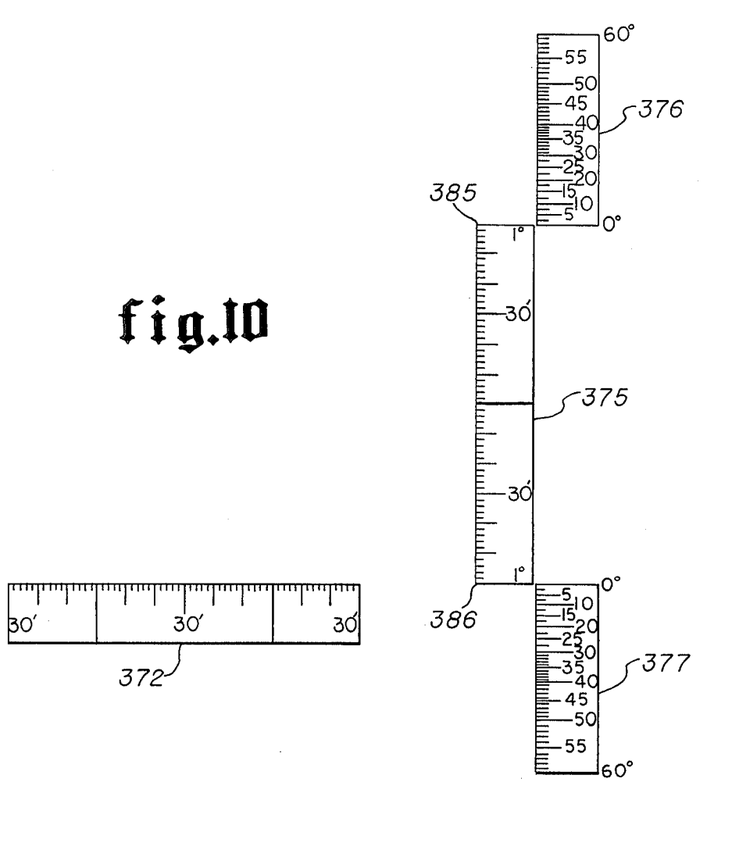
FIG. 10 illustrates the plotting board scale arrangement.

Referring now to FIG. 10, there may be seen a more detailed representation of the longitude scale 372 and extensible latitude scale 375. As shown, each scale spans a distance of 2°. At 0° latitude, the Equator, the spacing between the reference marks is the same for each scale. The relationship between the reference longitude mark spacing and the reference latitude mark spacing is, however, a function of the particular map projection which is employed, but in all cases will be a function of latitude. Accordingly, an extensible latitude scale 375 is provided for obtaining the proper spaced apart relationship. Correcting scales 376 and 377 are marked in degrees of latitude and the ends of extensible scale 375 are moved to correspond to the desired latitude, thereby varying the spacing between the reference marks on scale 375. For example, if the actual latitude is 40°, the upper end 385 of scale 375 is moved to 41° on scale 376 and the lower end 386 is moved to 39° on scale 386. The correct relationship is thereby automatically obtained.

The relationship between longitude scale 372, latitude scale 374, and correcting scales 376 and 377 is established by spherical geometry. A reference dimension is first established, which may conveniently be the longitude scale 372, where a linear dimension, $D_1$, is assigned to represent one degree of longitude. Then, the linear dimension, $D_2$, of the latitude scale 374 representing one degree of latitude at a given latitude, $La$, on the surface of the earth may be shown to be $$D_2 = D_1/\cos La.$$

Thus, at the equator, 0° latitude, $D_2 = D_1$, as shown in FIG. 10, by latitude scale 375 in the 0° position relative to correcting scales 376 and 377. At 60° latitude, $D_2 = 2D_1$, so that when the mark 385 is placed adjacent the 60° latitude mark on correcting scale 376, the linear dimension of scale 375 from the mid-scale position to the one degree mark 385 is twice the linear dimension representing one degree on longitude scale 372.

As shown in FIG. 10, latitude scale 375 represents 2° of latitude whereby the one degree mark 386 would be placed adjacent 58° latitude on correcting scale 377 when mark 385 is adjacent the 60° mark on scale 376 in the northern hemisphere. Thus, marks 385 and 386 are placed adjacent latitude marks on scales 376 and 377, respectively, which differ by two degrees. This distinction is not generally measurable on scales of conventional length until the latitude exceeds about 30°.

Numerous variations and modifications may obviously be made in the method and apparatus herein described without departing from the present invention. Accordingly, it should be clearly understood that the forms of the invention herein described and shown in the figures of the accompanying drawings are illustrative only and are not intended to limit the scope of the invention.

What is claimed is:

1. An apparatus for celestial navigation, comprising
means for deriving a first input functionally representative of the observed altitude of a selected celestial body,
means for deriving a second input functionally representative of the geographical coordinates of an assumed position,
means for deriving a third input functionally related to the ground position of said celestial body,
means for deriving from said second and third inputs a fourth input functionally representative of a first right spherical triangle having the apex of one of its acute angles at said ground position of said body and its hypotenuse between said ground position and said assumed position,
means for deriving from said first and third inputs a fifth input functionally representative of a second right spherical triangle proportional to said first triangle and having the apex of its corresponding angle at said ground position and its hypotenuse extending therefrom along the hypotenuse of said first triangle, and
means for deriving from said fourth and fifth inputs an output functionally representative of the coordinates of the point of position of the apex of the other acute angle of said second triangle.

2. The apparatus described in claim 1 further comprising,
means for deriving from said second and third inputs an output indication functionally representative of the bearing of a line of position perpendicular to said hypotenuse of said first triangle.

3. The apparatus described in claim 2 wherein said means for deriving said point of position of said apex of said other acute angle of said triangle further comprises
means for deriving an error signal functionally related to the ratio of said hypotenuse of said second spherical triangle and said hypotenuse of said first spherical triangle,
means for deriving the length of one of said legs of said second triangle in terms of degrees of latitude and as a functional relationship of said error signal and the corresponding leg of said first spherical triangle,
means for deriving the length of the other of said legs of said second triangle in terms of degrees of longitude and as a functional relationship of said error signal and the corresponding leg of said first spherical triangle.

4. The apparatus described in claim 3 wherein said means for deriving said error signal comprises
means for deriving the magnitude of said error signal as a function of said ratio of said second hypotenuse and said first hypotenuse, and
means for deriving the direction of said error as a function of said error magnitude and said second and third inputs.

5. The apparatus described in claim 4 wherein said means for deriving the direction of said error comprises
means for comparing said ratio of said second and first hypotenuse with a reference magnitude to obtain a functional representation of the location of said point of position relative to said ground position of said celestial body and said assumed position,
means for deriving a functional representation of said assumed position relative to the standard latitude and longitude reference positions and of said ground position relative to said assumed position,
logic means for combining said representations of said relative locations of said point of position, said assumed position and said ground position to obtain a functional representation of the direction for the longitude error, and
logic means combining said representations of said relative locations of said point of position, said assumed position and said ground position to obtain a functional representation of the direction for the latitude error.

6. The apparatus described in claim 2 further comprising
means for deriving a said point of position and a said bearing to determine a said line of position for a plurality of celestial bodies,
means for deriving a functional representation of reference latitude and longitude coordinates as a function of the latitude assumed for said assumed position, and
means for plotting a said line of position for each of said celestial bodies on said reference coordinates to define an actual position.

7. The apparatus described in claim 6, wherein said means for deriving reference coordinates further comprises
an extensible latitude scale,
uniformly spaced apart reference marks on said latitude scale, the spacing between said reference marks uniformly varying as said scale is extended, and
means for extending said latitude scale for obtaining a predetermined relationship between said spacing of said reference marks and a fixed scale for measuring degrees of longitude, said relationship being a function of said assumed latitude.

8. The apparatus described in claim 7, wherein said means for extending said latitude scale further comprises
a correcting scale to which at least one end of said extensible scale may be releasably connected, and
reference marks on said correcting scale to which said at least one end of said extensible scale is extended, said reference marks being variably spaced in degrees of latitude for obtaining said predetermined relationship between said extensible latitude scale and said fixed longitude scale.

9. The apparatus described in claim 8, wherein said means for plotting said lines of position comprises
a base assembly positionable on a plotting surface,
a disc rotatably connected with said base assembly and said disc defining an opening to said plotting surface, and
reference marks spaced to functionally represent degrees of compass bearing for orienting said rotatable disc to the desired bearing.

10. The apparatus described in claim 1 wherein said means for deriving said third input further comprises
memory means for reference ground positions for a plurality of selected celestial bodies,
access means for recalling said reference ground position for a selected celestial body from said memory, means for deriving a functional representation of the time elapsed from the determination of said reference ground position, means for deriving from said reference ground position and from said elapsed time a functional representation of the actual ground position of said selected celestial body.

11. In an apparatus for celestial navigation for deriving actual geographical position from a plurality of lines of position, an improved apparatus for obtaining the determinates of each of said lines of position as a point of position on each of said lines expressed in degrees of latitude and longitude and a bearing as derived from an observed altitude of a selected celestial body and an assumed position, said improved apparatus comprising means for deriving a first time-dependent input functionally related to the ground position of said celestial body, means for deriving from said first input and said assumed position a functional representation of a first right spherical triangle having a hypotenuse disposed between said ground position and said assumed position, a first leg with an arc length measured in degrees latitude and a second leg with an arc length measured in degrees longitude, means for deriving from said observed altitude for said celestial body a functional representation of the arc length of the hypotenuse of a second right spherical triangle proportional to said first triangle and said second hypotenuse having a first end at said ground position, means for deriving an error signal functionally related to the ratio of said second hypotenuse to said first hypotenuse, means for deriving from said error signal and said length of said first leg of said first triangle a first output indication functionally representative of the latitude of said point of position, means for deriving from said error signal and said length of said second leg of said first triangle a second output indication functionally representative of the longitude of said point of position, and means for deriving from said first input and said assumed position a third output indication functionally representative of the bearing of said line of position perpendicular to said hypotenuse of said first triangle.

12. The apparatus described in claim 11 wherein said means for deriving said error signal comprises means for deriving the magnitude of said error signal as a function of said ratio of said second hypotenuse and said first hypotenuse, and means for deriving the direction of said error as a function of said error and said first input magnitude and said assumed position.

13. The apparatus described in claim 12 wherein said means for deriving the direction of said error comprises means for comparing said ratio of said second and first hypotenuse with a reference magnitude to obtain a functional representation of the location of said point of position relative to said ground position of said celestial body and said assumed position, means for deriving a functional representation of said assumed position relative to the standard latitude and longitude reference positions and of said ground position relative to said assumed position, logic means for combining said representations of said relative locations of said point of position, said assumed position and said ground position to obtain a functional representation of the direction for the latitude error, and logic means combining said representations of said relative locations of said point of position, said assumed position and said ground position to obtain a functional representation of the direction for the longitude error.

14. The apparatus described in claim 11, wherein said means for deriving said first input further comprises memory means for reference ground positions for a plurality of selected celestial bodies, access means for recalling said reference ground position for a selected celestial body from said memory, means for deriving a functional representation of the time elapsed from the determination of said reference ground position, means for deriving from said reference ground position and from said elapsed time a functional representation of the actual ground position of said selected celestial body.

15. The apparatus described in claim 11, further comprising means for deriving a functional representation of reference latitude and longitude coordinates as a function of latitude assumed for said assumed position.

16. The apparatus described in claim 15, further comprising means for plotting said lines of position on said reference coordinates to define an actual position.

17. The apparatus described in claim 15, wherein said means for deriving reference coordinates further comprises an extensible latitude scale, uniformly spaced apart reference marks on said latitude scale, the spacing between said reference marks uniformly varying as said scale is extended, and means for extending said latitude scale for obtaining a predetermined relationship between said spacing of said reference marks and a fixed scale for measuring degrees of longitude, said relationship being a function of said assumed latitude.

18. The apparatus described in claim 17, wherein said means for extending said latitude scale further comprises a correcting scale to which at least one end of said extensible scale may be releasably connected, reference marks on said correcting scale to which said at least one end of said extensible scale is extended, said reference marks being variably spaced in degrees of latitude for obtaining said predetermined relationship between said extensible latitude scale and said fixed longitude scale.

19. The apparatus described in claim 18, further including means for plotting said lines of position, comprising a base assembly positionable on a plotting surface, a disc rotatably connected with said base assembly and said disc defining an opening to said plotting surface, and reference marks spaced to functionally represent degrees of compass bearing for orienting said rotatable disc to the desired bearing.

20. As a subcombination, apparatus comprising an extensible scale for deriving a functional representation of reference latitude and longitude coordinates as a function of the latitude assumed for an assumed position, said extensible scale having uniformly spaced apart reference marks, the spacing between said reference marks uniformly varying as said scale is extended.

21. The subcombination, described in claim 20, further comprising means for plotting lines of position on said reference coordinates to define an actual position.

22. The subcombination described in claim 20, wherein said extensible scale for deriving reference coordinates further comprises an extensible latitude scale, uniformly spaced apart reference marks on said latitude scale, the spacing between said reference marks uniformly varying as said scale is extended, and means for extending said latitude scale for obtaining a predetermined relationship between said spacing of said reference marks and a fixed scale for measuring degrees of longitude, said relationship being a function of said assumed latitude.

23. The subcombination described in claim 22, wherein said means for extending said latitude scale further comprises a correcting scale to which at least one end of said extensible scale may be releasably connected, and reference marks on said correcting scale to which said at least one end of said extensible scale is extended, said reference marks being variably spaced in degrees of latitude for obtaining said predetermined relationship between said extensible latitude scale and said fixed longitude scale.

24. The subcombination described in claim 23, further including means for plotting lines of position, comprising a base assembly positionable on a plotting surface, a disc rotatably connected with said base assembly and said disc defining an opening to said plotting surface, and reference marks spaced to functionally represent degrees of compass bearing for orienting said rotatable disc to the desired bearing.

* * * * *